(12) United States Patent
Du Preez et al.

(10) Patent No.: US 8,412,615 B2
(45) Date of Patent: Apr. 2, 2013

(54) MATERIALS SUPPLY CONTRACT SYSTEM AND METHOD

(75) Inventors: Anthony Gert Du Preez, Malvern East (AU); Jason Scott Ellenport, East Brighton (AU); Brendan Joseph Comas, Prahran (AU)

(73) Assignee: OZB2B Pty Ltd, Melbourne, Victoria (AU)

( * ) Notice: Subject to any disclaimer, the term of this patent is extended or adjusted under 35 U.S.C. 154(b) by 572 days.

(21) Appl. No.: 12/550,287

(22) Filed: Aug. 28, 2009

(65) Prior Publication Data

US 2010/0049593 A1 Feb. 25, 2010

Related U.S. Application Data

(63) Continuation of application No. 10/362,833, filed as application No. PCT/AU01/01110 on Sep. 4, 2001, now Pat. No. 7,593,885.

(30) Foreign Application Priority Data

Sep. 4, 2000 (AU) .................................. PQ9869
May 29, 2001 (AU) .................................. PR5323

(51) Int. Cl.
*G06Q 40/00* (2012.01)
(52) U.S. Cl. ......................................... 705/37; 705/7.35
(58) Field of Classification Search .................... 705/26, 705/37, 16
See application file for complete search history.

(56) References Cited

U.S. PATENT DOCUMENTS 5,615,269 A 3/1997 Micali
5,794,207 A 8/1998 Walker et al.
(Continued)

FOREIGN PATENT DOCUMENTS

AU 733969 3/1998
EP 1001355 5/2000
(Continued)

OTHER PUBLICATIONS

International Search Report, PCT/AU2005/000097, Apr. 15, 2005.
(Continued)

*Primary Examiner* — Matthew Gart
*Assistant Examiner* — Rokib Masud
(74) *Attorney, Agent, or Firm* — Reed Smith LLP

(57) ABSTRACT

The invention relates to a materials supply contract system and method for use in conducting business on-line over a network of computers such as the Internet. A method is provided for a buyer to award a supply contract, issued as a BOM, to a supplier selected from a panel of predetermined suppliers which each have a base supply contract with the buyer, the method being conducted over a computer network which comprises at least one buyer computer, an administrator computer and at least two supplier computers, the method comprising the steps of sending a buyer message from the buyer computer to the administrator computer identifying the BOM which includes at least one predetermined parameter (e.g. material requirement, business and market rules and/or special instructions), receiving the buyer message and displaying the BOM on a site on the administrator computer which is accessible by at least two supplier computers, sending a BOM message from the administrator computer to the at least two suppliers, receiving and storing an offer message in the administrator computer from one or more of the at least two supplier computers which includes an offer to supply goods or services in accordance with the BOM, sending an acceptance message from the administrator computer to the supplier computer which sent the successful offer, and sending a notification message from the administrator computer to the buyer computer notifying the buyer computer of one or more of the offers.

24 Claims, 6 Drawing Sheets

U.S. PATENT DOCUMENTS

| | | | |
|---|---|---|---|
| 5,873,071 | A | 2/1999 | Ferstenberg et al. |
| 6,141,653 | A | 10/2000 | Conklin et al. |
| 6,199,050 | B1 | 3/2001 | Alaia et al. |
| 6,216,114 | B1 | 4/2001 | Alaia et al. |
| 6,223,167 | B1 | 4/2001 | Alaia et al. |
| 6,230,146 | B1 | 5/2001 | Alaia et al. |
| 6,230,147 | B1 | 5/2001 | Alaia et al. |
| 6,415,270 | B1 | 7/2002 | Rackson et al. |
| 6,499,018 | B1 * | 12/2002 | Alaia et al. ............ 705/37 |
| 6,647,373 | B1 * | 11/2003 | Carlton-Foss .......... 705/37 |
| 6,647,374 | B2 | 11/2003 | Kansal |
| 6,718,312 | B1 | 4/2004 | McAfee et al. |
| 7,542,920 | B1 * | 6/2009 | Lin-Hendel ............. 705/26.3 |
| 2001/0021923 | A1 | 9/2001 | Atkinson et al. |
| 2001/0027431 | A1 | 10/2001 | Rupp et al. |
| 2001/0032167 | A1 | 10/2001 | Tulloch et al. |
| 2001/0032173 | A1 | 10/2001 | Alaia et al. |
| 2001/0039528 | A1 | 11/2001 | Atkinson et al. |
| 2001/0042039 | A1 | 11/2001 | Rupp et al. |
| 2002/0026400 | A1 | 2/2002 | Narayan et al. |
| 2002/0032621 | A1 | 3/2002 | Smith et al. |
| 2002/0042769 | A1 | 4/2002 | Gujral et al. |
| 2002/0082946 | A1 | 6/2002 | Morrison et al. |
| 2002/0161689 | A1 | 10/2002 | Segal |
| 2004/0193529 | A1 | 9/2004 | Asher et al. |
| 2004/0215526 | A1 | 10/2004 | Luo et al. |
| 2005/0234798 | A1 | 10/2005 | Du Preez et al. |
| 2007/0244762 | A1 | 10/2007 | Du Preez et al. |
| 2008/0313089 | A1 | 12/2008 | Du Preez |

FOREIGN PATENT DOCUMENTS

| | | |
|---|---|---|
| EP | 1085445 | 3/2001 |
| EP | 1170691 | 1/2002 |
| WO | WO0033223 | 1/2000 |
| WO | WO0017797 | 3/2000 |
| WO | WO0058898 | 10/2000 |
| WO | WO0079460 | 12/2000 |
| WO | WO0133449 | 5/2001 |
| WO | WO0143040 | 6/2001 |
| WO | WO0146833 | 6/2001 |
| WO | WO0148656 | 7/2001 |
| WO | WO0221347 | 3/2002 |
| WO | WO0229698 | 4/2002 |
| WO | WO03075193 | 9/2003 |
| WO | WO2005001597 | 1/2005 |
| WO | WO2005073882 | 8/2005 |
| WO | WO2007030873 | 3/2007 |

OTHER PUBLICATIONS

International Written Opinion of the International Searching Authority, PCT/AU2005/000097, Apr. 15, 2005.
International Preliminary Report on Patentability, PCT/AU2005/000097, Dec. 19, 2005.
International Search Report, PCT/AU2006/001337, Dec. 8, 2006.
International Written Opinion of the International Searching Authority, PCT/AU2006/001337, Dec. 8, 2006.
International Preliminary Report on Patentability, PCT/AU2006/001337, Aug. 17, 2007.
Wheatley, "Beyond Reverse Auctions," CPO Agenda, Spring 2005, pp. 42-45.
Office Action, U.S. Appl. No. 10/506,902, Mar. 6, 2009.
Reply to Election Requirement (37 CFR Section 1.146), U.S. Appl. No. 10/506,902, Apr. 6, 2009.
Office Action, U.S. Appl. No. 10/586,980, Feb. 25, 2009.
Response to Restriction Requirement, U.S. Appl. No. 10/586,980, Dec. 16, 2008.
Office Action, U.S. Appl. No. 10/586,980, Dec. 3, 2008.
International Search Report, PCT/AU2003/00279, May 12, 2003.

* cited by examiner under 35 U.S.C. §120 of U.S. application Ser. No. 10/362,833, filed on
MATERIALS SUPPLY CONTRACT SYSTEM AND METHOD

CROSS-REFERENCE TO RELATED APPLICATIONS

This application is a continuation application Jul. 21, 2003 now U.S. Pat. No. 7,593,885 which is a 35 U.S.C. §371 application of International Application No. PCT/AU01/01110, filed Sep. 4, 2001, which claimed priority under 35 U.S.C. §119 to Australian Application Nos. PQ 9869 filed Sep. 4, 2000 and PR 5323, filed May 29, 2001.

FIELD OF THE INVENTION

The present invention relates to a materials supply contract system and method for use in conducting business on-line over a network of computers such as the Internet.

BACKGROUND OF THE INVENTION

In this specification reference is made to a 'Bill of Materials' (BOM). A BOM may relate to the supply of goods and/or services, and for ease of reference these are generically referred to in this specification as materials. The BOM in this case is defined as the material purchase requirement, and includes the list of material items that the buyer will procure, as well as business rules, market rules, and any additional comments. A common term that may be used interchangeably with BOM in this context is 'Lot'.

Traditionally, a buyer of materials will prepare a 'Request For Quotation' (RFQ) and send this to a number of potential suppliers. The RFQ is used to acquire information and pricing about strategic goods and services. An RFQ may set out not only the specification of the materials required but other details of the buyers requirements, such as supply period, payment terms, return rules, liabilities for defects, indemnities against loss, etc. In reality, offers for the supply of materials received commonly have terms of supply which vary from the stipulations of the RFQ. For example, a particular supplier may be the one to offer the lowest price for the materials, but may not accept the supply term or liabilities set out in the RFQ. For materials supply critical to the buyer, this means that considerable time and effort in direct face-to-face negotiation with a number of suppliers is needed before a final contract for supply can be realised. This is the process of awarding a tender, which process includes reviewing submissions to the RFQ, selecting a winning tenderer, and finally contract negotiations to determine the final terms of trade.

In an effort to simplify the process, it has become common for buyers to approach a number of known suppliers for a certain category of goods or services in order to establish a panel of suppliers. Suppliers are often willing to participate in a selection process for appointment to a panel where the buyer constitutes a significant on-going purchaser of these types of materials. To be appointed to the panel, each supplier enters into a standard contract which specifies the general terms of supply of materials from that supplier to the buyer. Such contracts are referred herein as base supply contracts and deal with issues such as payment terms, return rules, liabilities for defects, indemnities against loss, etc, as mentioned previously. This means that when the buyer wishes to buy certain materials, only the panel of suppliers are approached and the RFQ is significantly simplified, as is any consequent offer for the supply of those materials.

The use of base supply contracts is now prevalent in not only the manufacturing industry but also the service industry.

Notwithstanding this, considerable manual effort is still needed to coordinate the selection of a supplier.

SUMMARY OF THE INVENTION

According to a first form of the invention, there is provided a method for a buyer to award a supply contract, issued as a BOM, to a supplier selected from a panel of predetermined suppliers which each have a base supply contract with the buyer, the method being conducted over a computer network which comprises at least one buyer computer, an administrator computer and at least two supplier computers, the method comprising:

a) sending a buyer message from the buyer computer to the administrator computer identifying the BOM which includes at least one predetermined parameter (eg. material requirement, business and market rules and/or special instructions);

b) receiving the buyer message and displaying the BOM on a site on the administrator computer which is accessible by at least two supplier computers;

c) sending a BOM message from the administrator computer to at least two suppliers;

d) receiving and storing an offer message in the administrator computer from one or more of the at least two supplier computers which includes an offer to supply goods or services in accordance with the BOM;

e) sending an acceptance message from the administrator computer to the supplier computer which sent the successful offer; and f) sending a notification message from the administrator computer to the buyer computer notifying the buyer computer of one or more of the offers.

In a preferred embodiment of the invention, the acceptance message includes a display and/or reference to the contract relating to the supply of the materials.

In a preferred embodiment of the invention, the BOM includes a time period for submissions of offers by the suppliers. The method may include the step of extending this time period, to enable submission of an improved final bid from at least some of the supplier computers from which offer messages were received.

In another preferred form of the invention, the method comprises the additional steps of establishing a panel of predetermined suppliers.

In another preferred form of the invention, the method comprises the step of addition to or removal of suppliers from the panel of predetermined suppliers.

In another preferred form of the invention, the method comprises the additional steps of comparing any offer received by the administrator computer under step (d) to prior offers received by the administration computer under step (d) and, if the latest offer is more than any of those prior offers, sending a message to the supplier computer of that supplier that a lower offer has been received by the administrator computer.

In a second form of the invention, there is provided a method for a buyer to award a supply contract to a supplier selected from a panel of predetermined suppliers which each have a base supply contract with the buyer, the method being conducted over a computer network which comprises at least one buyer computer, an administrator computer and at least two supplier computers, the method comprising the steps of:

(a) establishing key parameters for a BOM to be submitted by the administrator computer to the at least two supplier computers (eg. price, quality, delivery and service);
(b) applying a weighting to each of the parameters;
(c) applying a rating for each of these parameters for each supplier of the panel of predetermined suppliers;
(d) calculating an overall rating for each supplier of the panel of predetermined suppliers; and
(e) applying that overall rating to any offer received by the administrator computer from the supplier computer of that supplier in response to the release of a BOM to adjust that offer prior to comparison of that offer with any other offer.

In a preferred embodiment of the second form of the invention, applying a rating for each supplier in step (c) is based at least partially upon past performance of that supplier for each parameter. These include objective and subjective parameters such as previous timeliness of delivery of materials, quality of delivered materials, freight, price etc. In another preferred embodiment of the second form of the invention, the step of applying a rating for each supplier in step (c) is based at least partially upon other parameters outside the control of that supplier for each parameter, such as forecast material demand, commodity price forecasts, exchange rate forecasts, industry trends, historical bidding data, etc.

Typically the first and second forms of the inventions will be used in combination to optimise the overall system.

The method may include the step of providing to each supplier computer a 'current bid to win' (CBTW) in respect of said supply contract, the CBTW calculated by said administrator computer to dynamically indicate to a supplier the offer that that supplier must submit to compete with the best previous offer. The CBTW for supplier may be calculated in accordance with the formula:

$$CBTWx_m = FB_{n-1} - (MD/SFx)$$

where x indicates a particular suppliers X; m indicates that particular supplier's bid number; n indicates the overall bid number (ie 1.sup.st bid:n=1; 2.sup.nd bid:n=2; etc); FB indicates a factored bid for said particular supplier; MD indicates a set minimum bid decrement; and SF is the supplier factor set in accordance with said overall supplier rating. In a preferred embodiment, FB is calculated in accordance with the formula:

$$FB_n = SBx_n + (MD/SFx) - MD$$

where SB is a submitted bid.

The method may include the step of setting a reserve price for award of said supply contract, wherein no acceptance message can be sent for an offer that fails to comply with said reserve price.

The invention as defined above gives a business buyer access to a potentially powerful web-based procurement application that may be completely internally controlled by the buyer. Unlike most current procurement applications, the invention does not need to be third party controlled. The invention is adapted to be initialised, updated, and controlled by the procurement specialist within the buyer organisation.

It may also be optimally used for critical material procurement. However, use for non critical material procurement is also possible.

The invention is most suited to the procurement of critical materials usually sourced as an input directly into the manufacturing or production process. In this environment, the invention applies dynamic pricing theories in a critical procurement environment subject to complex contracts and longstanding buyer/supplier relationships.

Procurement of critical materials is considered a core competence of the buying organisation and is not normally outsourced.

The business philosophy behind the invention is that the buyer will normally select a panel consisting of a number of approved suppliers for material categories listed in a production or manufacturing BOM. As mentioned previously, traditionally, the buyer would identify suitable suppliers, then conduct an expensive tendering process to select a supplier for a multi-year contract.

The invention makes it possible for the buyer to establish an underlying base supply contract with multiple approved suppliers upfront, with no need to conduct a tendering process again. That is a panel of approved suppliers from which a buyer proposes to source its materials. Those contracts may be without limitation of period, or may have a fixed period. In theory these are base supply contracts which should only need to change when the buyers basic material needs change.

The procurement specialist within the buyer now can focus on the strategic role of maintaining the optimum panel by approving a new supplier to join the panel, or by removing a supplier from the panel which does not meet the preferred supplier basic requirements.

Once the supplier panel is established, and the base supply contract for each panel member is in place, the buyer simply releases a new BOM to the panel who will view and validate the BOM before conducting an online bidding event. During the bidding event the panel of suppliers will bid against each other for the right to supply the BOM.

The buyer is responsible for selecting, approving, rating and contracting with suppliers. An administrator computer external to the buyer may be used as a service to the buyer and generate a detailed report based upon past bidding events to aid with the supplier selection and rating. Basically, the buyer is in control of the procurement function, which is especially important for the procurement of direct materials (mission-critical or competitor-sensitive).

Significantly, the method and system of the invention allows the buyer to enter supplier ratings before a particular bidding event, these ratings then being modified on an ongoing basis between successive events to reflect a changing relationship between a buyer and the supplier panel members. Once a bidding event is complete according to the rules of that event, there is no post-event discussion before the contract is awarded, because the unique approach to automatic comparison of bids during the process itself precludes the need for such a process, thus providing a considerably stronger dynamic to the method than hitherto available. As discussed above, unlike some known auction models, which effectively outsource a buyer's supply needs to a third party procurement function, the present invention allows the buyer to retain the required control over the process.

The invention will be especially useful where the materials are specifiable (for example, the material item can be specified using an industry accepted code), contestable (multiple approved suppliers), and of sufficient value to justify the bidding process.

In summary, the system is commenced by a primary interaction between the buyer computer and the administrator computer. In this primary interaction, the buyer creates a supplier panel category/sub-category for a particular material type usually listed in a BOM.

The buyer forms a base supply contract with each supplier in the panel sub-category. The terms of the base supply contract will usually be identical for all panel suppliers. The base supply contract is usually an open-ended (no time limit) contract that specifies all requirements other than price, quantity, material, and some specific business rules such as payment terms, delivery terms, payment method etc. A unique base supply contract identifier for each supplier is recorded in an administrator computer against the panel sub-category identifier.

When the buyer is ready to release a BOM, it selects a panel of preferred/approved suppliers from the prescribed approved suppliers that are qualified to meet the minimum requirements (quality, warranty, service, delivery etc) as defined by the buyer.

In one particularly preferred form of the invention, each approved supplier will be given a rating report against qualitative criteria such as quality, service, warranty, etc in a proportion based on the importance of the qualitative criteria to the buyer. This aggregated supplier rating is the input to a factoring algorithm, where the qualitative criteria are reduced to a percentage scaling factor. This system is explained later in more detail.

This supplier unique percentage scaling factor, and the supplier specific ratings against the qualitative criteria, are usually only visible to the buyer and the particular supplier so rated, therefore allowing the supplier to work on increasing their individual assigned percentage factor by improving quality, service, warranty terms, etc. The reason a particular supplier will work to increase their rating is that this has a direct effect on their submitted bid, therefore allowing a higher actual bid to match a supplier who has been assigned a higher factor. By continuously reviewing each supplier's rating reports, and by analysing recorded bidding data, the buyer is able to optimise the supplier panel to achieve the best cost saving during the bidding event. This process is referred to as 'panel optimisation'.

Via the buyer computer, the buyer inputs into the administrator computer the dynamic business rules, such as payment, delivery terms, etc, which are not defined in the base supply contract, but are instead entered against each BOM in the administrator computer.

The buyer may now also forecast material demand, and optimise the BOM (using factored inputs such as material requirements forecasts, commodity price forecasts, exchange rate forecasts, industry trends, historical bidding data etc) to maximise the potential material cost saving from the active bidding process. This process is referred to as 'BOM optimisation' and is discussed later in more detail.

The BOM is then released by the administrator computer by sending a message to the supplier computers of the selected panel suppliers, who are then able to actively bid against the BOM under the buyer-defined market rules.

The supplier that has submitted the lowest factored bid to the administrator computer at the completion of the bidding time will be declared the winner.

A dynamic contract between the winning supplier and buyer is now formed by the administrator computer, and the details, including supplier name, material description, quantity ordered, and price achieved, are stored within the administrator computer. This contract is associated with the base supply contract already in place with the winning supplier.

The buyer will draw down (each purchase order issued against the dynamic contract will decrement the dynamic contract quantity) from the dynamic contract either manually or via a connected online purchasing application or via the client Enterprise Resource Planning (ERP) application.

In an alternative form to the above, the invention may involve a 'factored pricing' process, analagous to the factored bidding process. Factored pricing allows the buyer to apply factoring before an RFQ or BOM is released to prospective suppliers. Alternatively, where a supplier has the ability to vary one or more of the terms of contract (eg. payment terms), or to vary one or more of the specification criteria (eg. quality), this may be used for supplier self factoring before a bid is actually finalised.

In this form of the invention, there is provided a method for a buyer to award a supply contract to a supplier selected from a panel of predetermined suppliers which each have a base supply contract with the buyer, the method being conducted over a computer network which comprises at least one buyer computer, an administrator computer, and at least two supplier computers, the method comprising the steps of:

a) establishing parameters for an RFQ to be submitted by the administrator computer to at least two supplier computers, one of said parameters being price;

b) applying to the price, for each supplier of the panel of predetermined suppliers, a rating, in order to arrive at a factored price for each said supplier;

c) providing the RFQ and the respective factored price to each supplier of the panel of predetermined suppliers; and d) receiving an offer message in the administrator computer from one or more of at least two supplier computers which includes an offer to supply goods or services in accordance with the RFQ and the factored price.

In this way, the buyer can be notified that an RFQ has been accepted in accordance with the factored price and prescribed other parameters.

This form of the invention will typically be used in combination with the first form, to provide a bidding system using factored pricing parameters.

The buyer may choose either to award the contract on the first acceptance response received from a supplier at or below the factored price, or to award it to the supplier's which sets the lowest price below that supplier's factored price. In either case, the factored price becomes the basis of the contract offer.

Preferably, the rating for each supplier is based at least partially upon past performance of that supplier. That can depend on considerations such as timeliness of delivery, quality, service record, etc.

In a preferred form, the method includes the step of, for at least one of said parameters;

establishing a range of possible values of said parameter, each of said values being associated with a certain weighting factor; and providing said range of values to each supplier of the panel of predetermined suppliers.

Preferably, the rating applied to the price for each supplier is determined in accordance with said weighting factor, and may be provided to the respective supplier.

In this way, a relationship is established between each value and the applicable weighting factor. Each value represents an option for selection by a supplier, the respecting options each having a respective weighting factor which will affect the rating to be applied to arrive at that supplied factored price. This may be done automatically once an option is selected by the supplier, or the weighting factor may be provided to the supplier who may then 'self factor' in selecting an option.

According to the invention in yet another form, there is provided an administrator computer system for enabling a buyer to award a supply contract, issued as a BOM, to a supplier selected from a panel of predetermined suppliers which each have a base supply contract with the buyer, the system operating over a computer network and connecting to at least one buyer computer and at least two supplier computers, the system including:

a) means for receiving, from a buyer computer, a buyer message identifying the BOM, the message including at least one predetermined parameter (eg. material requirement, business and market rules and/or special instructions);
b) means for displaying the BOM on a site associated with the administrator computer which is accessible by at least two supplier computers;
c) means for sending a BOM message to one or more of the at least two supplier computers;
d) means for receiving and storing an offer message from one or more of the at least two supplier computers, the offer message including an offer to supply goods or services in accordance with the BOM;
e) means for sending an acceptance message to the supplier computer which sent the successful offer; and
f) means for sending a notification message to the buyer computer notifying the buyer computer of one or more of the offers.

The system preferably includes means for comparing any offer received by means (d) to prior offers received by means (d) and, if the latest offer is more than any of those prior offers, sending a message to the supplier computer of that supplier that a lower offer has been received by the administrator computer.

According to the invention in yet another form, there is provided an administrator computer system for enabling a buyer to award a supply contract to a supplier selected from a panel of predetermined suppliers which each have a base supply contract with the buyer, the system operating over a computer network and connecting to at least one buyer computer and at least two supplier computers, the system including:
(a) means for establishing key parameters for a BOM to be submitted to the at least two supplier computers (eg. price, quality, delivery and service);
(b) means for applying a weighting to each of the parameters;
(c) means for applying a rating for each of these parameters for each supplier of the panel of predetermined suppliers;
(d) means for calculating an overall rating for each supplier of the panel of predetermined suppliers; and
(e) means for applying that overall rating to any offer received by the administrator computer from the supplier computer of that supplier in response to the release of a BOM to adjust that offer prior to comparison of that offer with any other offer.

Preferably, the system includes means for providing to each supplier computer a current bid to win (CBTW) in respect of said supply contract, the CBTW calculated by said administrator computer to dynamically indicate to a supplier the offer that that particular supplier must submit (at or below) to compete with the best previous offer.

According to the invention in yet another form, there is provided an administrator computer system for a enabling a buyer to award a supply contract to a supplier selected from a panel of predetermined suppliers which each have a base supply contract with the buyer, the system operating over a computer network and connecting to at least one buyer computer and at least two supplier computer, the system including:
a) means for establishing parameters for an RFQ to be submitted to the at least two supplier computers, one of said parameters being price;
b) means for applying to the price, for each supplier of the panel of predetermined suppliers, a rating, in order to arrive at a factored price for each said supplier;
c) means for providing the RFQ and the respective factored price to each supplier of the panel of predetermined suppliers; and
d) means for receiving an offer message from one or more of at least two supplier computers which includes an offer to supply goods or services in accordance with the RFQ and the factored price.

The system in this form may include means for, for at least one of said parameters;
establishing a range of possible values of said parameter, each of said values being associated with a certain weighting factor; and
providing said range of values to each supplier of the panel of predetermined suppliers.

BRIEF DESCRIPTION OF THE DRAWINGS

To more clearly illustrate a form of the present invention, it will now be described by reference to a non-limiting embodiment, and with reference to the accompanying drawings, in which.

DETAILED DESCRIPTION OF THE INVENTION

The following description outlines integrated embodiments of the invention which combine different forms of the invention. The explanation is for illustration purposes only and does not restrict the scope of the invention in any way. The description that follows refers to the accompanying drawings which diagrammatically illustrate various features of the system described. In particular, FIGS. 1-12 illustrate the functional requirements of the system and method described, whilst FIG. 13 depicts the various components (and their interrelation) of the system in operation.

A. System Overview

The described system provides for users an online environment to prepare for, conduct and review bidding for BOMs.

There are three distinct users of this network system—buyers via buyer computers, suppliers via supplier computers and administrators via administrator computers—and hence three different views of information.

A buyer will be able, via its buyer computer, to create BOMs, distribute them to the supplier computers of selected suppliers and then watch the bidding process take place. At the end of the bidding process, the buyer will know they will be buying at the best price from one of their selected suppliers. Supporting functions such as creating and maintaining BOMS, creating and maintaining supplier lists, viewing summary details of BOMs, viewing active BOMs, viewing pending BOMs, and finding old BOMs through a history function, will be available to buyers on the buyer computer and/or by access to the administrator computer.

A supplier will be able to participate, via its supplier computer, in bidding for BOMs that a buyer has invited them to bid for. Competing suppliers will actively bid against each other in a competitive network environment for the right to supply a BOM to the buyer. Supporting functions such as viewing the BOM, validating the BOM, viewing Pending BOMs, and finding old BOMs through a history function, will be available to suppliers on the suppliers computer or by access to the administrator computer.

The buyer and their selected suppliers will be able to have access to, and view, bidding for a BOM on the administrator computer.

Administrators by operation of the administrator computer will be responsible for entering in account details for suppliers and buyers. It is only when the administrator computer does this that the buyer computer or supplier computer will have access to the administration computer.

The administrator of the administrator computer will also have privileged access to the system so that they are able to view any BOM information, or view any active BOMs that may be in the middle of a bidding process. The administrator may of course be within the buyer organisation. The administrator computer will also need to associate suppliers to buyers and will also be able to run activity and account reports.

B. Requirements

Figure 1:
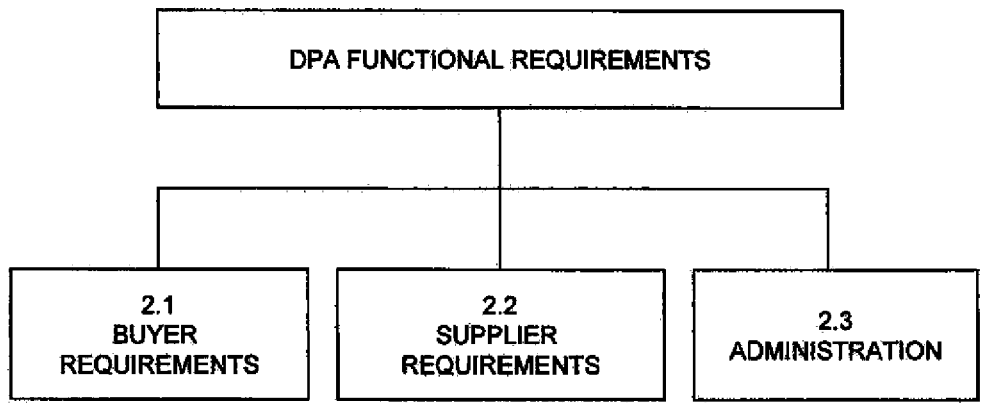
FIG. 1 diagrammatically provides an overview of a system according to the present invention.

This section describes functionality for the invention which is designated hereafter as Dynamic Pricing Solution (DPS). There are three sections to the DPS. There are the buyer functions, supplier functions, and administration facilities (The system overview is shown in FIG. 1).

1. Buyer Functional Requirements

Figure 2:
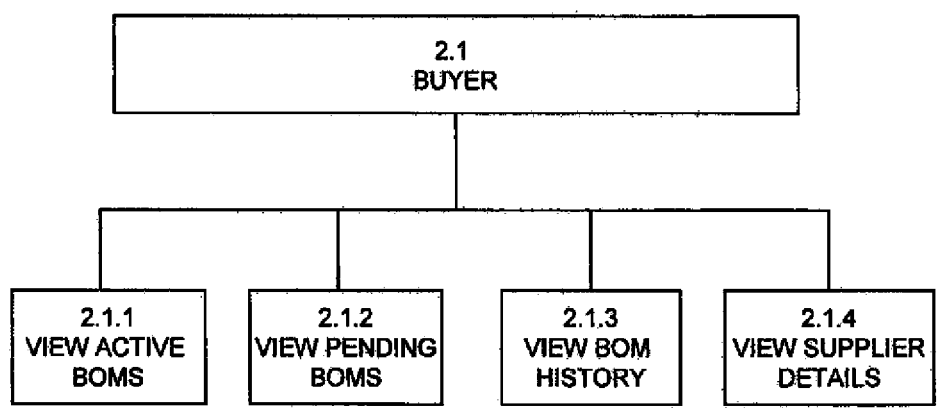
FIG. 2 diagrammatically illustrates buyer functional requirements of the system.

The buyer functional requirements are shown in FIG. 2.

Figure 3:
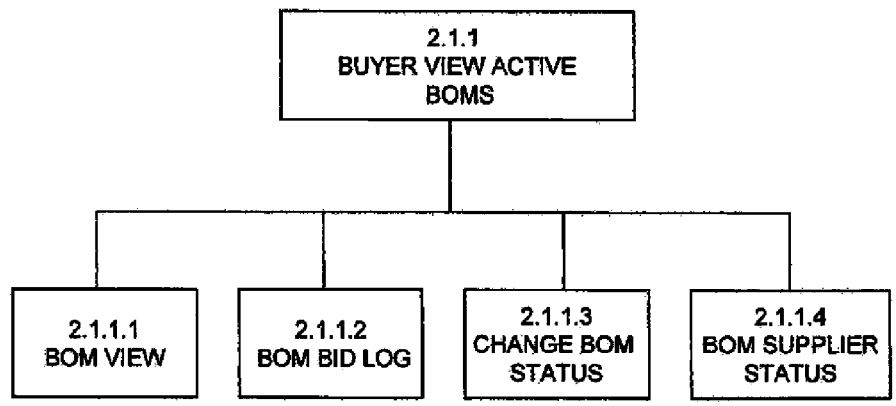
FIG. 3 diagrammatically illustrates buyer view active BOM information.

(i) Buyer View Active BOMs (FIG. 3)

This will be the default page displayed by the administrator computer when a buyer logs in to the system. It will display all BOMs that have been scheduled for the current day. This means the BOMs on this page will have a status of Active. Note that the BOMs will not disappear from this page when bidding is complete, but only when the clock turns over to the next day.

From this page the buyer will be able to view a summary of the BOM, view a bid summary of the BOM if bidding has taken place, change the status of a BOM from Active to Draft and check the status of suppliers that have been invited to participate in the bidding.

BOM Table

Each row in the table will have details for one BOM only

BOMs displayed have a status of Active

BOMs displayed are for the current day (24 hour period) or within their activation period prior to the start of bidding BOMs ordered by start bid time Active BOMs will be displayed in a different colour to those that are not involved in bidding at the current time.

User will only be able to select one BOM at a time

BOM Information

The following will be displayed for each BOM:

BOM Id (made up of company ID, YYMMDD, BOM ID, version number)

BOM Start Bid Time

BOM End Bid Time

BOM Starting Price

Number of suppliers that have validated the BOM

Submitted Bid

Factored Bid

Current Bidder

BOM Bid Graph

The Bid graph will plot a graph of successful Bids vs. Time for the selected BOM in the table. In the case that bidding has not yet taken place, the graph will be empty.

Onscreen Buttons

BOM View

BOM Bid Log

Change BOM Status

BOM Supplier Status a) BOM View

Will invoke the BOM View page for the selected BOM.

b) BOM Bid Log

Will invoke the BOM Bid Log page for the selected BOM.

c) Change BOM Status

Will change the status of the selected BOM from Active to Draft. A confirmation message will be sent first to confirm that the buyer wishes to change the status of the BOM from Active to Draft. The BOM status can only be changed provided that the current time is before the BOM start bid time. All suppliers that have validated the BOM will be notified by email that bidding for the BOM will no longer take place.

d) BOM Supplier Status

Will invoke the BOM Supplier Status page.

Figure 4:
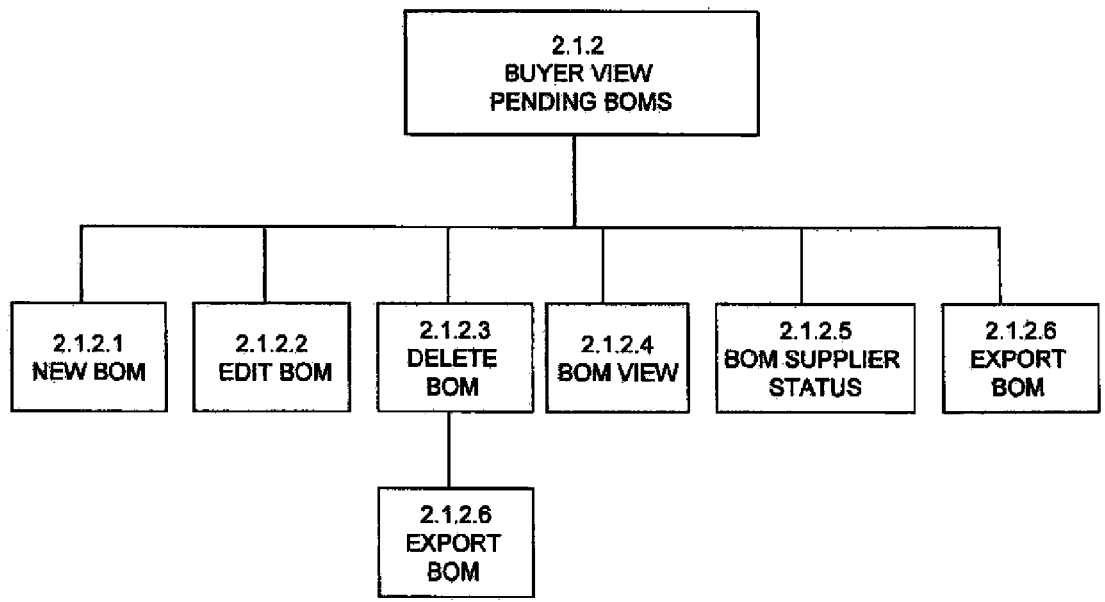
FIG. 4 diagrammatically illustrates buyer view pending BOM information.

(ii) View Pending BOMs (FIG. 4)

This page will display for buyers BOMs that have a status of Draft or Released but a start bid date that is later than the current day. The buyer is able to add, edit and remove a BOM from this page as well as be able to view a summary of the BOM details, change the status of a BOM from Released to Draft and check the status of Suppliers that have been invited to participate in the bidding. In addition, a BOM can be exported to a text file.

BOM Table

Each row in the table will have details for one BOM

BOMs displayed have a status of Released or Draft

BOMs ordered by start bid time

Buyer will only be able to select one BOM at a time draft BOMs will be displayed in a different colour to Released BOMs BOM Information The following will be displayed for each BOM BOM Id BOM Start Bid Date/Time BOM Opening Bid Number of Invited Suppliers Number of suppliers that have viewed the BOM Number of suppliers that have validated the BOM Onscreen Buttons a) New BOM Will invoke the BOM Wizard. All fields in the wizard will be blank.

b) Edit BOM
- Will invoke the BOM Wizard. All fields in the wizard will be populated with the selected BOMs details. A Released BOM cannot be edited until its status has been changed to Draft. Note that a BOM with a status of Draft is released through this process.

c) Delete BOM
- If the BOM is a draft then the BOM will be deleted. A confirmation message will allow the buyer to confirm that they wish to delete the draft and then give them the option to export the BOM to a text file.
- If the BOM is released, it's status changes from Released to Draft. The Released BOM details will then appear in BOM History.

d) BOM view
- Will invoke the BOM View page for the selected BOM.

e) BOM Supplier Status
- Will invoke the BOM Supplier Status page.

f) Export BOM
- This allows the user to save the BOM in a text file on their personal computer.

Figure 5:
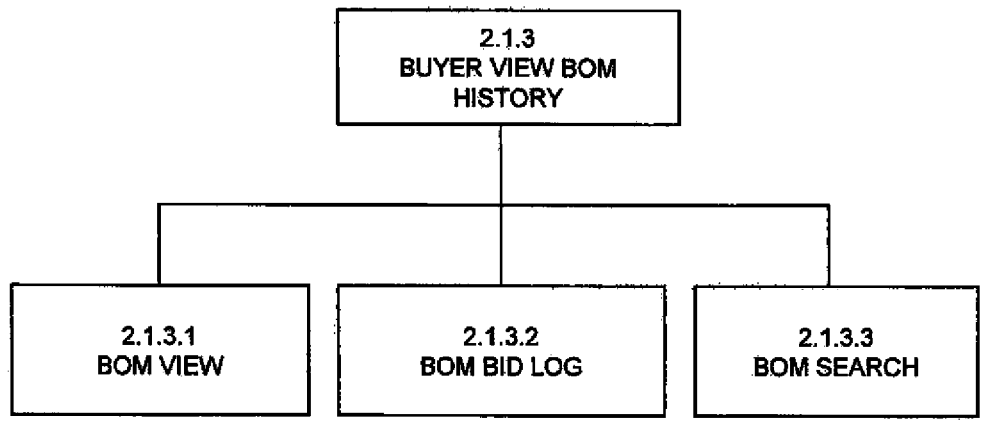
FIG. 5 diagrammatically illustrates buyer view BOM history information.

(iii) View BOM History (FIG. 5)

This page will allow the user to view BOMs that have been closed. That is released BOMs with an end bid date that has expired and is older than the current day, or, released BOMs that have been deleted. The user will be able to find the required BOM by use of filters. These filters will help find the BOM(s) required. The buyer will also be able to view the BOM details and also the Bid Summary to see how the bidding process proceeded.

BOM Filters
From date
To date
Supplier
Category
Sub-category
Contract Number
BOM ID
BOM Table
Each row in the table will have details for one BOM
BOMs displayed have a status of Released and the current date is later than the end bid time date
BOMs ordered by end bid time
User will only be able to select one BOM at a time
BOM Information
The following will be displayed for each BOM
BOM Id
BOM Start Bid Time
BOM End Bid Time
BOM Opening Bid
Successful Supplier
Winning Bid
Onscreen Buttons a) BOM View
- Will invoke the BOM View page for the selected BOM.

b) BOM Bid Log
- Will invoke the BOM Bid Log page for the selected BOM.

c) BOM Search
The search will return a list of BOMs that fit the criteria entered in the filters. The BOMs will be displayed in the table.

Figure 6:
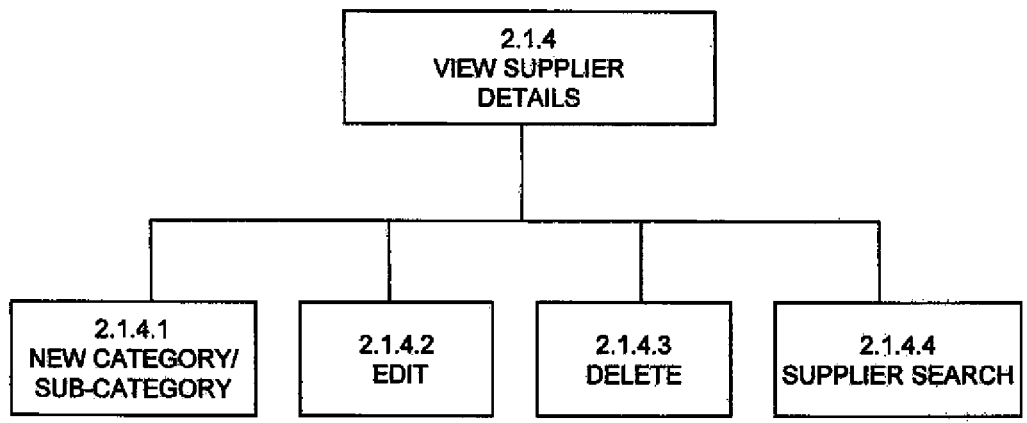
FIG. 6 diagrammatically illustrates buyer view supplier information.

(iv) View Supplier Details (FIG. 6)

This page will allow a buyer to associate suppliers with particular categories. Here the buyer will be able to create a new category and subcategory as well as create and maintain supplier lists for those categories. This page will also allow the buyer to enter supply criteria for a selected subcategory, rate the importance of each criteria item, and importantly rate the supplier performance against each criteria item specified.

The filters will help the buyer find a particular supplier list.
Filters
Category
Sub-Category
Supplier Table
Each row in the table will be for one supplier
Suppliers ordered by supplier name in alphabetical order
Supplier Information
The following will be displayed for each supplier
Supplier Name
Supplier Contract Number
Supplier ratings and scaling factor
Onscreen Buttons
New Category/Sub Category
Edit
Supplier Search
Delete Sub-Category
Business Rules
Business rules associated with the category Contract Id will be displayed.

a) New Category/Sub Category
- The buyer will be able to create a new category and sub-category in this page. The contract number associated with the category/sub-category combination will also be entered here.
- Drop-down lists will be available for selecting existing categories. If a new category is required, an edit field is provided which allows the buyer to type in a new one.
- Data to be entered:
  - Category
  - Sub-Category
  - Category Contract Number
- There may be specific business rules associated with the Category Contract Number. These rules can be entered here and include:
  - Delivery Terms
  - Delivery Date
  - Payment Terms
  - Payment Method
  - Delivery Location
- If set here, these rules will populate the Create BOM Wizard Set Business Rules edit boxes.

b) Edit
- Will invoke the Supplier List Wizard for the selected Category/Sub-Category. See below for further details.

c) Delete
- This will delete a Sub-Category (not a Category) and all associated information.
- Note that the Sub-category information is not actually deleted from the database (just marked as deleted for the purpose of View BOM History) but will not be accessible for use again.

d) Supplier Search
- The search will return a list of suppliers and associated business rules that fit the criteria entered in the filters. The suppliers will be displayed in the table.

(v) BOM Wizard

The wizard will be used to create a BOM or edit an existing BOM. If the buyer is creating a new BOM the edit boxes will be blank. If the buyer is editing an existing draft BOM, the edit fields will be populated with the existing data for the selected BOM but this information can be changed.

Figure 7:
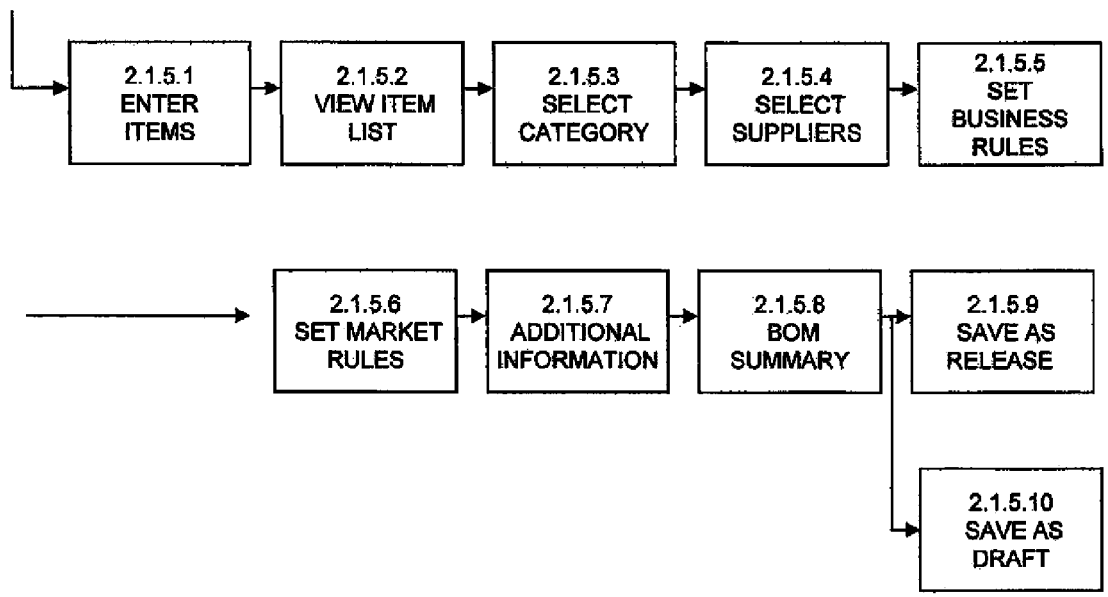
FIG. 7 diagrammatically illustrates buyer view BOM creation and editing.
Figure 8:
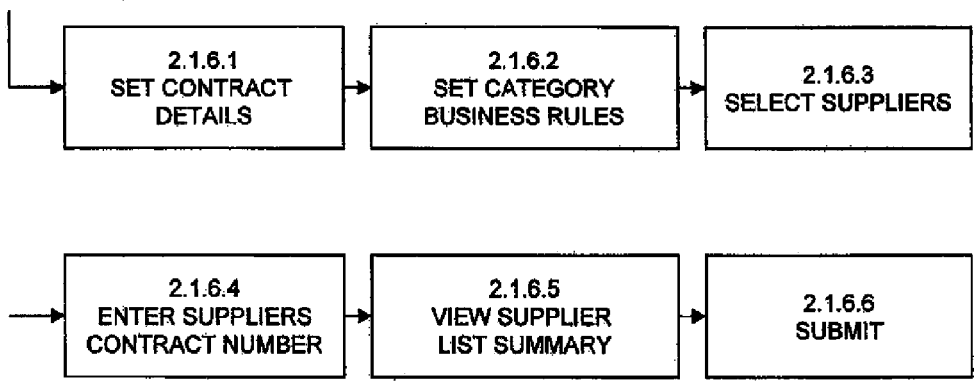
FIG. 8 diagrammatically illustrates the buyer view supplier list wizard.

FIG. 7 diagrammatically illustrates the steps in creating and editing a BOM with the BOM wizard.
  a) Enter Items
    This page will allow the buyer to enter/edit Item details for the BOM. Data required for each item is as follows:
    Part Number
    Description
    Stock Number
    Unit
    Manufacturer
    Quantity
    Model Number
  This information can be included in the BOM by typing each item in, or alternatively, importing the details from a text file.
  b) View Item List
    This list will display all Items entered for the BOM in a table format. From here the buyer can edit an Item or accept the list of Items.
  c) Select Category and Sub-Category
    The user will be able to select a Category and Sub-category from drop-down lists. Note that these categories are the ones the buyer has entered through the New Category/Sub-Category page found on the View Supplier Details page.
  d) Select Suppliers
    A list of suppliers will be displayed that can supply to the category and sub-category selected. This page will also display the individual supplier ratings against the supply criteria, and the resultant bid scaling factor. The buyer can select the suppliers they wish to participate in the BOM bid by checking the check box next to the supplier. Note that the suppliers listed are suppliers that have an existing contract with the buying organization.
  e) Set Business Rules
    These edit boxes may be populated if these rules have been previously set in the Category Contract, otherwise they can be set here. Note that if these rules have been set in the Category Contract, they will not be able to be edited.
    Data Required:
      Delivery Terms
      Delivery Date
      Payment Terms
      Payment Method
      Delivery Location
  f) Set Market Rules
    Data Required:
      BOM View Start Time
      BOM View End Time
      BOM Validate Start Time
      BOM Validate End Time
      BOM Bid Start Time
      BOM Bid End Time
      Minimum Bid Increment
      Starting Price
      Submitted Bid
      Factored Bid
      Various flags for extension period
      Various flags for setting reserve price
  g) Additional Information
    Additional Comments:
      The buyer can enter additional comments that need to be placed into the BOM here.
    Email Notification:
      In addition, the buyer can also enter the email notification text the supplier it to be sent when the BOM is Released on this page.
  h) BOM View Summary
    This page will provide the buyer with a summary of all information entered through the BOM wizard through use of tabs. Tabs are:
    BOM
    Selected Suppliers
    Business Rules
    Market Rules
    Additional Information
  i) Save BOM as Release
    The BOM can be saved as a draft or can be Released to the suppliers selected in the above process. If the BOM is to be Released, the Terms and Conditions must have been read and a check box must be checked otherwise the BOM will not be released. If the Terms and Conditions have been read and the BOM is Released, an email is sent to all selected suppliers containing the text entered in the Additional Information email notification text box (2.1.5.7). The BOM will now appear on the Pending page.
  j) Save BOM as Draft
    If the BOM is to be saved as a draft, no email notification is sent to the suppliers. The draft BOM will appear on the Pending page. To release the BOM, the buyer will select the appropriate menu option.

(vi) Supplier List Wizard (FIG. 8)
The wizard will allow the buyer to associate suppliers with a category/sub-category.
The wizard will be used to create a supplier list or edit an existing supplier list. If the buyer is creating a new list the edit boxes will be blank. If the buyer is editing an existing list, the edit fields will be populated with the existing data but this information can be changed.
  a) Select Category/Sub Category
    The buyer will select a Category and Sub-category from drop-down lists. The Category Contract number will be automatically displayed once the Category and Sub-Category have been selected.
  b) Set Category Business Rules
    These rules have been previously entered into the system by the Buyer when creating a new Category and Sub-Category in View Supplier Details—New Category/Sub-Category. They can be changed here.
    Business rules displayed are:
      Delivery Terms
      Delivery Date
      Payment Terms
      Payment Method
      Delivery Location
  c) Select Suppliers
    The buyer can select the suppliers they wish to include in this category by checking the check box next to the supplier.
  d) Enter Supplier Contract Number
    For each supplier selected, the buyer will need to enter a unique Supplier Contract Number. On entry to this page, the Category Contract number will be the default Supplier Contract Number for each supplier. The Buyer will then need to add a unique suffix to this number to provide the unique number. If the Category Contract number is not applicable to a particular Supplier, it can be deleted and another number can then be used.

e) View Supplier List Summary
   The submit button on this page will save all information and return the user to the View Category/Supplier Details page.
f) Submit
   Submit will commit the new supplier list to the database.

2. Supplier Functional Requirements

Figure 9:
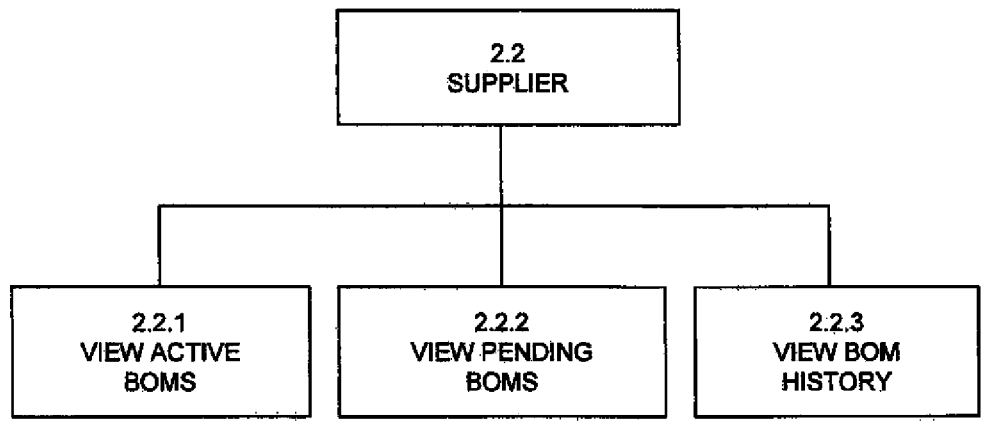
FIG. 9 diagrammatically illustrates supplier functional requirements.

The Supplier Functional Requirements are shown in FIG. 9.

Figure 10:
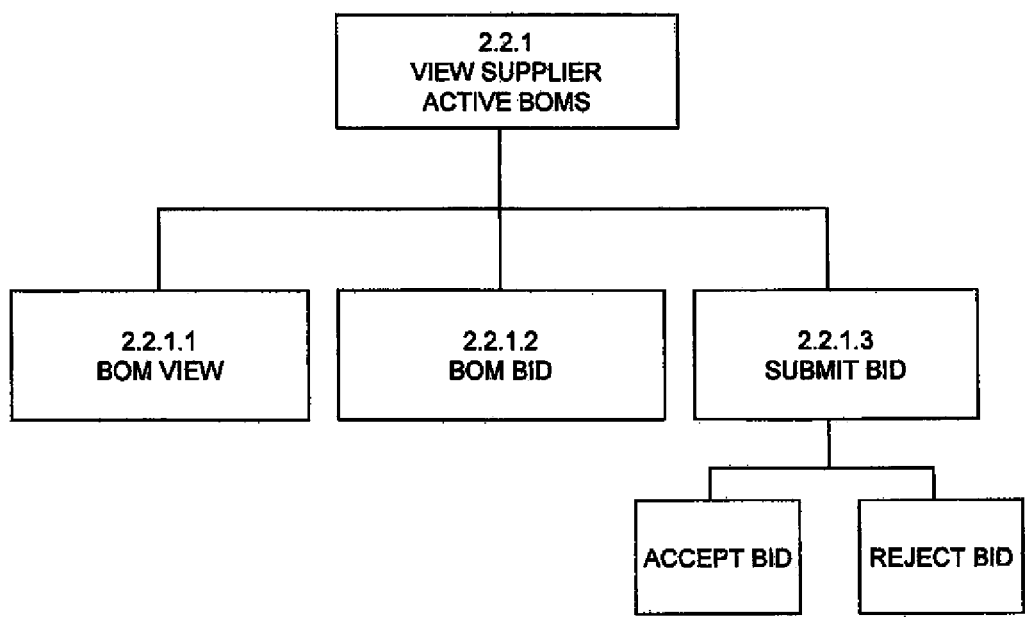
FIG. 10 diagrammatically illustrates supplier view active BOM information.

(i) View Active BOMS (FIG. 10)

This will be the default page displayed when a supplier logs in to the administrator computer system. It will display all BOMs that have been scheduled for the current day. This means the BOMs on this page will have a status of Validated. Note that the BOMs will not disappear from this page when bidding is complete, but only when the clock turns over to the next day.

From this page the supplier is able to view a summary of the BOM, view a bid summary of the BOM if bidding has taken place, and submit a bid for a BOM currently in a bidding process.

BOM Table
Each row in the table will have details for one BOM
BOMs displayed have been validated
BOMs displayed are for the current day (24 hour period)
BOMB ordered by start bid time
Active BOMB (in bidding process at current time) will be displayed in a different colour to those that are not involved in bidding at the current time.
User will only be able to select one BOM at a time
BOM Information
The following will be displayed for each BOM
BOM Id
Buyer Account Name
BOM Start Bid Time
BOM End Bid Time
BOM Starting Price
Current Bid To Win
Submitted Bid
Factored Bid
Status (indicating whether supplier holds current winning bid or not)
New BOM Bid
The current bid is displayed for the selected BOM.
An edit box will allow data entry for new Bid Amount
BOM Bid Graph
The Bid graph will plot a graph of successful Bid vs. Time for the selected BOM in the table. In the case that bidding has not yet taken place, the graph will be empty.
Onscreen Buttons
a) BOM View
   Will invoke the BOM View page for the selected BOM.
b) BOM Bid Log
   Will invoke the BOM Bid page for the selected BOM.
c) Submit Bid
   A new Bid will be submitted for the selected BOM. The new bid will be the amount entered in the New Bid Amount edit box.
   When the submit button is clicked, a confirmation message appears stating "You are about to submit a bid of $X against BOM Y, contract number Z, for company XYZ. Your submitted bid of $X has been scaled back by f% (your buyer assigned bid scaling factor), therefore your bid of $X will be recorded as $Y. Do you wish to proceed?"
   The supplier can then select Yes or No.
   No—Supplier is returned to the Active page
   Yes—Bid is submitted
   If the bid is outside 500% of the minimum bid, a confirmation message is to be displayed stating this. The supplier can then select Yes or No.
   If the bid is outside 1000% of the minimum bid, a stronger confirmation message is to be displayed stating this. The supplier can then select Yes or No. In another version of this, the supplier can set a floor price that is not able to be seen by the buyer.
   No—Supplier is returned to the Active page
   Yes—Bid is submitted
(1) Bid Accepted
   The bid will be accepted if it is below the current factored bid.
      The supplier will receive a message stating "Your bid of $X has been accepted at 24hESTDDMMYYYY"
(2) Bid Rejected
   The bid will be rejected if another bid was received that was less than the supplier's submitted bid, or the bid time has expired:
      The supplier will receive a message stating "Your bid of $X was rejected at 24hESTDDMMYYYY"

Figure 11:
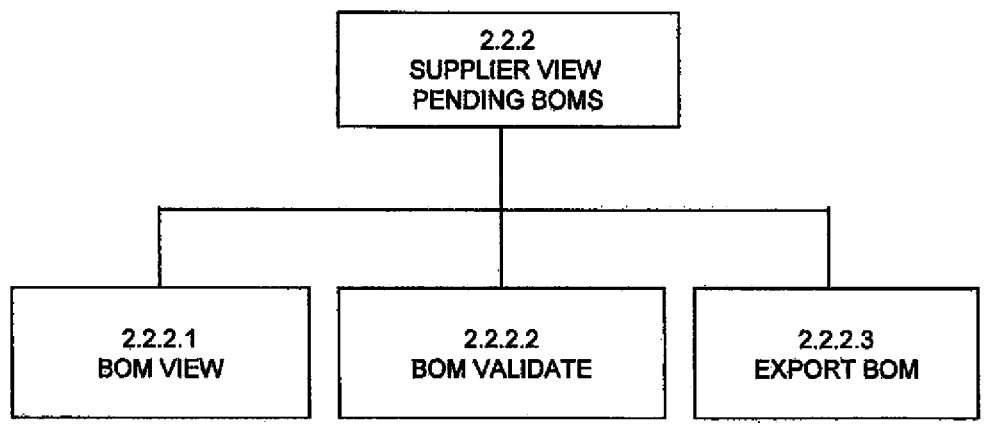
FIG. 11 diagrammatically illustrates supplier view pending BOM information.

(ii) View Pending BOMS (FIG. 11)

This page will display for suppliers BOMS that have a bid date that is later than the current day. The Supplier is able to View, and Validate a BOM. In addition, a BOM can be exported to a text file.

BOM Table
Each row in the table will have details for one BOM
BOMs ordered by start bid time
User will only be able to select one BOM at a time
BOMs displayed are those that the user has been invited to bid for
BOM Information
The following will be displayed for each BOM
BOM Id
Company Name
BOM View Start Time
BOM View End Time
BOM Validate Start Time
BOM Validate End Time
BOM Start Bid Time
BOM End Bid Time
BOM Starting Price
If Viewed
If Validated
Onscreen Buttons
BOM View
BOM Validate
Export BOM
a) BOM view
   Will invoke the BOM View page for the selected BOM.
b) BOM Validate
   Will invoke the BOM View page for the selected BOM. From here the supplier will be able to Validate the BOM to confirm their participation or non-participation in the bidding process. A confirmation message will be displayed to ensure the supplier is certain they wish to participate in the bidding process.
c) BOM Export
   In addition to the BOM view, the supplier will be able to export the BOM to a text file.

Figure 12:
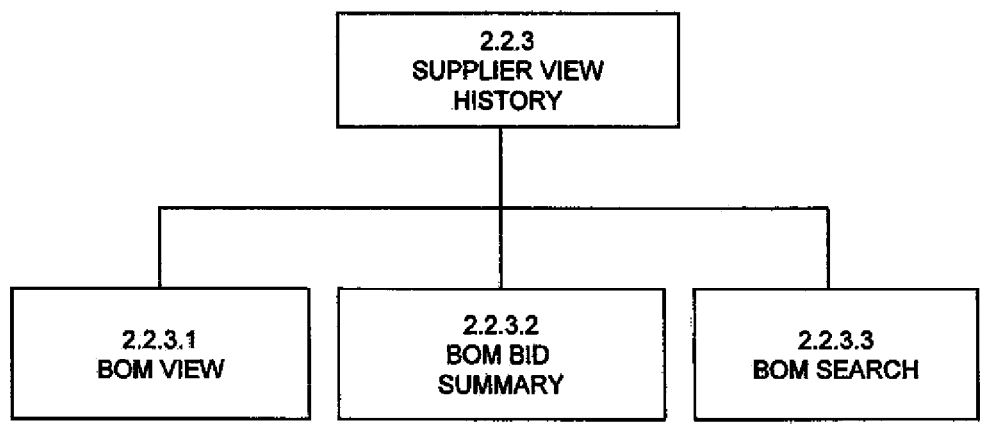
FIG. 12 diagrammatically illustrates supplier view BOM history information.

(iii) View BOM History (FIG. 12)

This page will allow the supplier to view BOMS that they have validated in the past. The supplier will be able to find the required BOM by use of filters. These filters will help find the BOM(s) required. The supplier will also be able to view the BOM details and also the Bid Summary to see how the bidding process proceeded.

BOM Filters
From date
To date
Buyer
Contract number
BOM ID
BOM Table
Each row in the table will have details for one BOM
BOMs displayed are those that have a bid time that has expired and have been validated by the supplier
BOMs ordered by start bid time
User will only be able to select one BOM at a time
BOM Information
The following will be displayed for each BOM
BOM Id
Buyer Account Name
BOM End Bid Time
BOM Opening Bid
Contract ID
Winning Bid
Onscreen Buttons
a) BOM View
 Will invoke the BOM View page for the selected BOM.
b) BOM Bid Log
 Will invoke the BOM Bid page for the selected BOM.
c) BOM Search
 The search will return a list of BOMs that fit the criteria entered in the filters. The BOMs will be displayed in the table.

3. BOM View

The BOM View is a summary page for the BOM selected by the Buyer.

This page will provide the buyer with a summary of all information available for the BOM through use of onscreen tabs. Tabs are:

BOM Items
Selected Suppliers/Buyers
Business Rules
Market Rules
Additional Information This will display the same information as is found in the BOM Wizard.

Note that if the supplier is requesting a BOM View, buyer details are displayed, but when a buyer is requesting a BOM View, supplier details are displayed.

4. BOM Bid Log

This page will display for the buyer or the supplier a summary of the bidding process in a table. Available information for buyers is:

Bid Time
Bid Amount
Bidding Supplier
Available information for Suppliers is:
Bid Time
Bid Amount 5. BOM Supplier Status The BOM Supplier Status page will list Suppliers that have been invited to participate in the bidding for a selected BOM. It will show in table format next to each supplier if that supplier has viewed the BOM and if they have validated the BOM. It will also show their quoted price and logon status.

6. Transaction Settlement

The transaction Settlement takes place once the BOM bid time has expired. The winning supplier is the supplier that has bid the lowest bid before the bidding time is over.

(i) No Successful Bids

It may be the case that no bids were made during the bidding time. In this case, after the bid time has expired, a message is sent to all participating parties:

"There was no successful bid for BOM X scheduled at 24hrESTDDMMYYYY"

In addition, the buyer will be sent another message:

"BOM X has been saved as a Draft".

(ii) Winning Bid

The successful bid is the lowest factored bid submitted prior to the bidding time expiring.

a) Notify Winning Bidder
 A message is sent to the successful supplier:
 "Congratulations, your last bid was successful. You are the winning bidder for BOM 'X', contract number 'Y', at '24HH' for the amount of $'X'. Company 'XYZ' has been notified. Thank you for your participation."
b) Notify Unsuccessful Bidders
 A message is sent to the unsuccessful suppliers:
 "Bidding has concluded. Unfortunately you have been unsuccessful for BOM 'X', contract number 'Y', at '24HH'. The winning factored bid was $'X' for 'account name XYZ'. Thank you for your participation."
c) Notify Buyer
 "Bid time for BOM 'X' has expired. Supplier 'XYZ' was the successful bidder at $'X' for contract number 'Y'. The supply company 'XYZ' has been notified. All unsuccessful suppliers have also been notified. Thank you for your participation."

7. Administration Functional Requirements

The Administration functions will enable the operator to enter details for buyers and suppliers to be able to use the application. This includes creating new accounts, editing accounts details, running reports and ensuring users have access to their information.

(i) Reports

Two reports are available; the Activity Report and the Account Report. Both of these reports may be produced manually or automatically.

a) Activity Report
 The activity report will provide information on all Accounts for a specified period.
 Data required:
 Start date
 End data
 These above dates will define the reporting period.
 The report will provide the following information:
 Account Number
 Company name
 BOM ID
 Date of Transaction
 Time of Transaction
 Winning Supplier
 Winning Bid Amount ($)
 Category and Sub Category
 Contract Reference Number
 Transaction Fee (%)
 Transaction Fee ($)

Transaction Number b) Account Report

The Account report will provide information on specific buyer Accounts for a specified period. The report is to be available on-line and the administrator will be able to print it.

Data required:
Start date
End data
Account name/Account number

The report will provide the following information:
Account Number
Company name
Contract start date
Contract end date
Volume transacted ($) (winning bids)
Total Transacted fee $ (ie (transacted $).times.(% fee))
Category and Sub Category
Contract Reference Number
Transaction Fee (%)
Transaction Fee ($)
Transaction Number (ii) Edit Account Details The administrator will be able to enter new and change account details for the accounts in the system.

Details include:
Account Number (Industry ID+XXXX)
Company name
Industry
Account ID
Billing Contact Details
Administrator Contact Details
User Contact Details
Contract ID
Contract start and end date
Account transaction fee
Buyer or Supplier
Australian Business Number
Membership fee (iii) Associate Suppliers with Buyers It is the responsibility of the Administrator to associate suppliers with a buying company.

All account information for the suppliers must be in the system before suppliers can be associated with the buyer. Multiple suppliers will be associated with a single buyer.

The administrator will be able to find a buyers supplier list by searching by use of filters:
Company name (any buying company)
Contract number
Account number A list of suppliers associated with the buyer will then be displayed. The administrator will then be able to remove a supplier from the list or add a new supplier to the list.

Note that buyers will only have access to suppliers that they are associated with.

(iv) Privileged Account for System Access

A user with access to this account will be able to view BOM information for any account on the system.

They will have access to the Active, Pending, History and Supplier details for any buyer account. Note, the Company Name will be displayed on the screen in the place of Authority as shown to the buyer.

8. Security Requirements

User Id and Password access provide security for system access by users. Encryption and Digital Certificates may additionally be used to authenticate users of the application.

9. Factored Bidding

As mentioned above, factored bidding will allow the buyer to set supply criteria for a particular subcategory of materials. Each material subcategory (panel) can have different supply criteria. For example Toyota might, for a category 'Camry' and subcategory 'Tyres' set supply criteria as price, quality, delivery, and service. Whereas, for Toshiba, manufacturing laptop computers, the category 'Satellite Pro' and subcategory 'LCD Display' might have supply criteria of warranty, quality and price.

Once the actual criteria are identified, the buyer will numerically rate the importance of each of the identified criteria, eg from a scale of 1 to 10 (the scale itself is not important as long as the rating is representative of the importance of the criteria in an absolute and a relative sense).

As a purely fictional scenario, Toyota might set: price—9, quality—7, delivery—8, and service—6, out of a maximum score of 10 for each criteria established against Camry/Tyres.

Toshiba might set warranty—9, quality—7, price—5, once again out of a maximum score of 10, for each criteria listing established against Sattelite Pro/LCD displays established criteria.

The next stage is for the buyer to consider how well each panel supplier for the specific subcategory is performing or should be rated (from historical interactions) against each of the identified criteria.

Toyota could have 3 suppliers that can all supply Camry tyres to the required specification ie Toyota has 3 approved Camry tyre suppliers that will form the panel for the Camry Tyres subcategory in the administrator computer. The three might be Dunlop, Michelin, Bridgestone. Toyota creates the following supply matrix.

| Criteria | Rating | Dunlop | Michelin | Bridgestone | Total |
| --- | --- | --- | --- | --- | --- |
| Price | 9 | 5:00 | 8:00 | 4:00 | 00 |
| Quality | 7 | 7:49 | 3:21 | 6:42 | 70 |
| Delivery | 8 | 9:72 | 5:40 | 7:56 | 80 |
| Service | 6 | 7:42 | 4:24 | 8:48 | 60 |
| Total | | 28:163 | 20:85 | 25:146 | 210 |
| Factor | | 0.776 | 0.405 | 0.695 | |

Note. Price can be specified so that the supplier knows how important price will be in the selection process. The rating that the buyer gives each supplier on price is good feedback to the supplier about how cost competitive the buyer perceives the particular supplier to be. The price criteria will not usually be used to factor the bidding amount.

The factor is calculated by firstly determining the maximum score that a supplier can achieve for a particular subcategory i.e. a particular panel. For the Toyota example the maximum score possible is 210. This is calculated by multiplying the buyer rating for each criteria with 10 (the maximum possible score that a supplier can achieve for a particular criteria), then adding the individual criteria score to get the total 210. Quality has a buyer rating of 7, which gives 70 when multiplied by 10. 70 added to delivery of 80 and service of 60 gives a total of 210.

Once the total denominator (210 in the Toyota example) is calculated, the total for each supplier is calculated in a similar way. This time, however, rather than multiplying the rating by 10, it is multiplied by the actual score assigned for that criteria to the individual supplier. For Dunlop as an example, quality has a rating of 7 which, when multiplied by Dunlop's score for quality of 7, gives a total score for Dunlop's quality of 49.

The 49 is added to the score for delivery and service to give a total for Dunlop of 163. This score of 163 for Dunlop is now divided by the total for the panel (210), to give a factor of (163/210) or 0.776 for Dunlop.

This factor of 0.776 is critical to Dunlop, as the factor is used to scale Dunlop's bid during a bidding event. Dunlop may pay the price for low scores on quality, service etc by finding it more difficult to win business from Toyota. Or Dunlop's profitability is being impacted (by having to bid lower for new work) because it has not paid attention to all the supply criteria.

The factor value is only important when considered in the context of how much of a handicap it presents for a particular supplier when compared to the other supplier in the panel. So the relative factor value is more important than the absolute value.

This factor and the ratings and criteria are visible to Dunlop, which allows Dunlop to work with the buyer to improve their assigned factor.

Over time the administrator computer will collect data on all the supply criteria. This will allow the administrator computer to help buyers make decisions about how to rate a particular supplier. For example the administrator computer will measure payment time, and delivery time automatically from the buyer's ERP system. This data will be analysed and presented to the supplier as an input to the supplier rating process.

An example algorithm for carrying out the factored bidding process is described below. The following terms are used.

| Term | Definition | Value Range |
|---|---|---|
| SB | Submitted Bid | SB > 0 |
| CBTW | Current Bid To Win | CBTW > 0 |
| SP | Starting Price | SP > 0 |
| FB | Factored Bid | FB > 0 |
| MD | Minimum Decrement | MD > 0 |
| SF | Supplier Factor | SF > 0 |
| n | Global bid number ie $1^{st}$ bid, $2^{nd}$ bid n = 1, 2, ... | n ≧ 1 |
| m | Individual supplier bid number | m ≧ 1 |
| X | Supplier 'X' | |

Bidding Logic $$FB_1 = SP$$

This merely states that the first (calculated) factored bid should also equate to the starting price, to accommodate the following formulas.

$$FB_n = SBx_n + (MD/SFx) - MD$$

[note $FB_n = SBx_n$ where SF=1.0]

All submitted bids are transformed via the above formula using the corresponding supplier factor. This formula ensures that the rules of decreasing bids hold for running a reverse auction based on the Factored Bid. The case for SF=1.0 simply means that the factored bid is equal to the submitted bid. This represents a notional 'perfect' supplier.

$$SBx \leq CBTWx$$

Given that there is a minimum bid decrement (to avoid immaterial bids) and that the supplier submitted bids are factored, it is unlikely that suppliers will be able to readily calculate their next bid in order to hold the current bid. For this reason, an additional informational field is required and is labeled 'Current Bid To Win'. This field is related directly to the supplier factor and effectively tells a supplier the maximum that they can enter as a submitted bid. In turn this is factored and results in them winning based on the current factored bid. This also reduces the chance of them having to enter multiple bids whilst effectively guessing where they have to bid to win the business. Of course, it is possible that Supplier X will not win the bid if Supplier Y also enters a bid a split second before, since now CBTWx has been recalculated.

$$CBTWx_m = FB_{n-1} - (MD/SFx)$$

where n≧2 and CBTW>0

In order for the suppliers to make bids with the best chance of winning, they need some guidance via a 'ready reckoner', since their raw submitted bid is always factored and may result in them making an uncompetitive bid. The premise of factored bidding is that suppliers with higher ratings can bid higher amounts than those with lower ratings and still win the business. The above formula achieves this effect by factoring the minimum decrement then subtracting this from the last factored bid to calculate the bid to win the business.

Under this scenario, if Supplier 1 has a higher factor than Supplier 2, $(MD/SFx)_1 < (MD/SFx)_2$, meaning that Supplier 1 can enter a higher bid ($CBTW_{1n}$) and win the business from Supplier 2 with $CBTW_{2n}$.

The form of this equation ensures that the relative difference between suppliers is maintained at all levels of bidding. This reflects associated fixed cost differences such as freight, that are payable irrespective of the winning bidder, if prices are quoted FOB (Free On Board) for example.

In the system developed using the factored bidding technique, the following points apply:

All the above calculations are performed to at least six (6) decimal places. This avoids rounding errors which may have a material effect.

The active pages include the fields of 'Submitted Bid' and 'Factored Bid'.

Entries only appear in a 'Submitted Bid' field if the supplier logged on to the system holds the current factored bid. This is also indicated by a green traffic light symbol in the Status field.

An additional field called 'Current Bid To Win' is included on the screen. This is a display only field and is calculated separately for each supplier.

The Bid History includes fields for 'Submitted Bid' and 'Factored Bid'. The Factored Bids are shown for all bids. The Submitted Bids are only shown for the bids of the supplier's logged in.

10. Time extensions—Best and Final Price

In general, an online bidding event is run for a fixed period of time (such as thirty minutes). At the end of this time, as measured by the server clock, the lowest factored bid is accepted. The use of a fixed period of time contributes to the efficient price discovery mechanism of the process, and encourages bidders (suppliers) to enter their bids within this prescribed period (which is published in advance). By limiting the entire event to a reasonably short period, bidders are encouraged to actively view and participate in the event, rather than simply to enter a bid then logoff.

In certain situations, the bid submission may be affected by the participants' physical ability to respond. The success of a bidder may be dependent on the dexterity and nerve of the participating suppliers, and when dealing with substantial contracts, this effect can tend to compromise the desired intent of providing an efficient and transparent mechanism for trading, whereby each supplier has the opportunity to submit their best offer in response to real-time competitor actions.

This effect can mean that the buyer may not receive the very best offer possible, because the event time may expire before a counter bid can be made.

For the above reasons, it is possible to include in certain online auctions the function of an automatic extension of the event duration, if a bid is received within a specified window at the close of the event (typically five minutes). The event is then extended by say, an additional fifteen minutes. It is, however, important that events represent a credible trading environment for buyers and sellers, and the rules of the system must be clearly communicated to all participants. It is also important that the process be kept rapid and efficient, and that, at the conclusion of the event, the result is known immediately. This time extension capability is particularly useful with high value, strategic materials where significant shifts in the bidding activity can occur in the final stages of an online event.

The time extension, which is an integer number in minutes, may be chosen as an option by the party creating a BOM, eg by ticking a button to indicate that this option is to be activated for a particular event. The default option selects <TIME EXTENSION NOT SUPPORTED>. An indication that the option has been selected will appear on all screens containing the market rules of the bidding event.

A further parameter is required to indicate when the time extension is to be activated, the <ACTIVATION PERIOD>. This is the time prior to the close of bidding in which a submitted bid causes the event to be extended by one extension period. A logic check is applied to ensure that the activation period is less than (but not equal to) the extension period. The activation period should have a label of <ACTIVATED DURING LAST:> and a suffix of <MINUTES>.

There is no limit on the number of extension periods, but the application can include an additional parameter to specify <MAXIMUM NUMBER OF PERIODS>, which has a default value of <NONE> displayed. The bid extension time extends from the <BID END TIME> of the original to the current end time of the current extension period.

The original <BID END TIME> appears on the screen in its standard form, and in order to indicate that an extension occurred historically, an additional 'Extension Period' column is added to the history screen, populated by the total number of minutes for all the extension periods that have been triggered.

The bidding logic should operate as follows when the time extension option is activated for a particular BOM:

If a bid is submitted within the activation period, the bidding event continues for an amount of time equal to the extension period.

The 'Time Remaining' for the event is reset and counts down from the extension period.

A suitable indicator should makes clear to the user that the bidding event is into the extension period. The normal bidding logic in terms of current bid to win, minimum decrement and factored bid should apply to the time extension period.

As explained above, in an online bidding event the best price may not be achieved, due to suppliers being unable to submit their real 'best and final' price before the expiry of the fixed duration. The 'auto-extend' function described above is one way of mitigating this problem.

An alternative approach, referred to herein as the 'Best and Final Bid' function, applies a systematic approach, wherein suppliers who have submitted a bid during the course of the normal bidding event are given the opportunity to submit a 'best and final bid' (BAF) once the event has concluded. A preferred set of rules for this process is as follows:

Only suppliers who have submitted bids during the course of the bidding event are eligible to submit a BAF.

The buyer is able to determine how many bidders are included in the BAF. For example, the three suppliers with the lowest factored bids at the end of the normal bidding time may be eligible.

Assuming three eligible suppliers, the suppliers with the two highest factored bids are each presented with the option of submitting a BAF at the end of the event (ie after the bidding time has elapsed according to the server clock). It is not mandatory to submit a BAF, even if the supplier is eligible to do so. In order to preserve the concept of factored bidding, each supplier is presented with their CBTW (Current Bid To Win) as in the normal bidding event described above. Each of these suppliers can then submit a bid, which is factored as normal to result in a factored bid.

It is only possible for each supplier to submit one BAF bid, at or below their CBTW.

After a suitable elapsed period (eg. one minute), the option to submit a BAF for these bidders is removed.

The lowest factored bid from this process is then used to calculate the equivalent submitted bid for the supplier with the lowest factored bid from the normal bidding event.

This remaining supplier is then presented with the option of submitting a BAF, based on the calculated submitted bid as above. In this case, the supplier is presented with a CBTW value which they need only match to win the business. In this way, the relativity amongst suppliers is preserved throughout the entirety of the event. In this way, to encourage the function is not abused, the supplier with the lowest factored bid during the normal event is rewarded with the ultimate BAF option.

11. Reserve Price

With factored bidding, once a supplier submits a suitable bid, the buyer is bound to accept it and award a contract. This necessitates the buyer having to set a starting price that is often too low to attract any supplier bids, which can also arise when the buyer does not solicit any indicative pricing from suppliers prior to the event and the expectations between buyer and supplier vary widely. There is also a desire to make the online bidding process more closely resemble a true negotiation, whereby both parties may have quite different opening positions.

For this reason, it is desirable to have the ability to solicit indicative prices from suppliers prior to setting the starting price for a bidding event. Without resorting to performing a full-blown RFQ, this can be achieved during the BOM Validation phase. Based on the prices received from suppliers, the buyer has better information with which to set his starting price. It is also desirable for the buyer to have the ability to set a reserve price, above which he is not bound to accept any offer.

When a reserve price is set, the transparency and fairness of the process must be firmly adhered to in order to engender supplier acceptance.

The system requires that a reserve price is always set prior to a bidding event. The reserve price may be set or changed up until the BOM becomes Active. Since some material prices are highly volatile, it is desirable to leave the setting of the reserve until as close to the time when the BOM becomes active as possible. A parameter is indicated on the 'Market Rules' page where the buyer provides an indication of the number of hours before the start time that the BOM is activated (and thus transferred to the active page).

The rules relating to the reserve price are as follows:
The reserve is not disclosed to the suppliers until it is reached during the course of a bidding event
Once the reserve price is reached, the contract will be awarded to the bidder with the lowest factored bid at the close of the bidding event.
If the reserve is not reached, the buyer has the right not to proceed with any contract; if however the buyer chooses to proceed with awarding a contract, he must do so with the bidder holding the lowest factored bid at the close of the bidding event. The rules surrounding the event must preclude any post-event negotiation. This is necessary to retain the credibility, transparency and fairness of the process.
Once the reserve price is reached during the course of an online bidding event, this is indicated to all suppliers by an appropriate indicator or message on the Active screen.

12. Request for Opening Bid

Generally, the buyer initially specifies a starting price for a bidding event, which effectively becomes the first factored bid from which each supplier's CBTW is then calculated (see above). The starting price is required as an input to calculate the factors for each supplier. Even if the starting price subsequently changes, the relative difference between the suppliers will remain the same (assuming their factors do not change from those initially calculated).

In order to have a more market-driven starting price, the suppliers may be required to submit a contractual price when they validate the BOM. This quoted price is then treated as their first submitted bid, and from this the corresponding factored bid is calculated. The lowest factored bid—based on the first submitted validation bid of each supplier—will be calculated when each supplier validates, and this becomes the new starting price. The bidding event therefore commences with a starting price equal to the lowest factored bid from the panel of suppliers who have validated the BOM. The CBTW for the supplier with the lowest factored bid, for example, will thus be his first submitted bid, less the minimum decrement.

In some cases, a very low quote may be returned (eg supplier dumping price), that could invalidate the event. In this case, the Buyer needs the ability to override the starting price. This would only be possible via a separate menu option, prior to the BOM becoming activated. The menu option should be labeled 'Override Starting Price'. This would take the Buyer to the 'Market Rules' page with only the 'Starting Price' field open for editing.

13. Factored Pricing

The factoring concept described above can be extended to factored pricing. Generally, such an approach is associated with RFQs, whereby the buyer specifies the criteria that is important for a particular material category/sub-category, and then rates each supplier against these. In this way, the buyer can set an acceptable price for the material, and then the respective suppliers' factors are applied to this price to arrive at a factored price for each supplier.

Suppliers are notified via email of this factored RFQ, which is then open for a limited time. During this time, suppliers can log onto the system website and view the details of the RFQ as well as their factored price. They then have the option of accepting the conditions of the RFQ at (or below) the suggested price. This price is used as a final price that forms the basis of the contract, if it is accepted by the supplier.

Once a supplier accepts the RFQ conditions and the price, the buyer is notified and can compare responses by multiple suppliers. The selection of a winning supplier can be automated for purely 'factored' information, although it is likely that the buyer would do this manually in the first instance. Alternatively, the buyer can set the factors and rate each supplier, then set a benchmark price which is scaled for each supplier based on their factoring information. Each supplier who logs in sees their respective factored price for the BOM specified, and can choose to accept that price or submit a lower price. Now the buyer has the option of either setting a rule whereby the first accepted response by a supplier at or below their factored price will win the business, or a rule whereby the buyer then has the option to choose the best deal (eg. the supplier that sets the price with the largest margin below their factored price).

A variation on this is that the buyer specifies criteria, each with suggested values. An example of this would be:

| Payment Terms | 7 days |
| | 14 days |
| | 30 days |
| | 60 days |

The buyer may choose one of these values and make it mandatory i.e. cannot be varied in the response by the supplier. Alternatively, the buyer may suggest a value (eg 60 days) but leave it open so that the supplier can modify the value (eg 30 days). This could then be used by the buyer, once the response has been received, in awarding the RFQ to a particular supplier. Alternatively the buyer chooses to show the various factors to the respective suppliers, along with the associated options, and leaves it to the supplier to select an option. In this way the supplier is effectively self factoring.

Once a value is selected, the system may be arranged to automatically factor the supplier on their response, so that competing responses can be compared and ranked by the system.

If several suppliers respond by accepting the RFQ conditions, and their factors are within an acceptable range to the buyer, a bidding event for the business could follow the RFQ process. In this case the buyer is setting factors based on known information about the suppliers. This is especially important if the buyer has not worked with a particular supplier before, or if the buyer is purchasing a material type for the first time. The buyer is using the factored pricing functionality as a discovery process for the factored bidding event. This will be most important for project based industries in which one-off designs are prevalent or where timing of material purchases is more sporadic than manufacturing based industries.

A worked example of this process is shown below:

| Buyer Specification | | |
| --- | --- | --- |
| Stainless Steel Tape | Delivery schedule | Business Rules |
| Type 304D 2Bfinish | 1 March 20 tonnes | Delivery Terms FIS |
| Size 305 mm × 0.8 mm | 10 April 20 tonnes | Payment Terms 60 days |
| Quantity 60 tonnes | 25 May 20 tonnes | Base price/kg $4.00/kg |
| Roll weight 2000 kg | | |

Suppliers

After factoring suppliers in the same way as for factored bidding, this is then applied to the buyer's target price to arrive at a price for each supplier as shown in the table below:

| Supplier | Factor | Base Price ($/kg) | Factored Price ($/kg) |
| --- | --- | --- | --- |
| Supplier 1 | 1.00 | 4.00 | 4.00 |
| Supplier 2 | 0.95 | 4.00 | 3.80 |
| Supplier 3 | 0.84 | 4.00 | 3.36 |

Once a supplier accepts the factored price together with the associated specification and commercial terms, the buyer is able to choose to award the business to that supplier.

Where a supplier has the ability to select some of the terms (eg payment terms) or to vary the specification (eg quality), this may affect their factor. In the first instance, a buyer may choose to revise a supplier's factor on this particular attribute which would affect their overall rating for that material and hence their factored price. This process could be automated, so that as the supplier selects varying terms, the factored calculation is done by the system immediately. Here the relationship between the selection values and the resultant factoring is stored by the system. This approach therefore allows the supplier to effectively perform some 'what if' analysis when selecting the available options from the specifications.

This invention provides a fundamentally different approach to the conventional 'reverse auction' concept, and allows a participating organisation's budget for strategic materials contracting to be employed in a highly cost-effective manner in a competitive online bidding process, whilst reducing the time for 'price discovery' in comparison with the conventional RFQ process.

In traditional reverse auction processes for strategic material supply, the vendors compete on price and the buyer then somewhat arbitrarily chooses the winner after the event based on what can be a laborious evaluation of criteria other than direct pricing. The problem with this approach, apart from the time it takes, is that it destroys the credibility of the bidding event, since the lowest bidder may not necessarily win the contract. The present invention addresses this drawback of the conventional methodology.

As previously mentioned, the invention in its various forms gives a business buyer access to a potentially powerful web based procurement application that may be completely internally controlled by the buyer.

The present invention may be applied to the procurement process for any goods or services which are sufficiently valuable (to justify use of the process), specifiable (so that competing suppliers are able to interpret the requirements, and to afford a consumer basis for comparison), and contestable (ie more than one supplier has the capability to fulfil the request). Although the examples given in this description relate to 'direct' material, used as direct inputs to a manufacturing process, the invention is equally applicable to 'indirect' inputs (travel, freight, consumables, etc.).

The word 'comprising' and forms of the word 'comprising' as used in this description does not limit the invention claimed to exclude any variants or additions.

Modifications and improvements to the invention will be readily apparent to those skilled in the art. Such modifications and improvements are intended to be within the scope of this invention.

What is claimed is:

1. A method for a controlling party to award a contract to a bidding party selected from a panel of predetermined bidding parties, the method conducted over a computer network which comprises at least one controlling party computer, an administrator computer and at least two bidding party computers, the method involving a competitive auction event conducted to result in said contract award, key contract parameters having been established in advance of said auction event and provided to the bidding parties wherein the key contract parameters include at least one non-price parameter, the method comprising:

applying a weighting process by said administrator computer with respect to said parameters for each bidding party of the panel of predetermined bidding parties, to calculate a rating for each said bidding party; and during said auction event, receiving respective bids from the respective bidding party computers, adjusting said bids by said administrator computer by applying said ratings for the respective bidding parties, and using said ratings to provide to each bidder an indication of a current bid to win (CBTW) in respect of said contract, the CBTW calculated by said administrator computer to dynamically indicate to a bidding party the offer that said party must submit to compete with the best previous bid;

wherein the controlling party is a seller and the bidding parties are prospective buyers, each bid received from bidding party computers representing an offer to buy goods or services.

2. The method of claim 1, wherein said key contract parameters are selected from a group including price, quality, delivery and service.

3. The method of claim 1, wherein the calculation of said rating is based at least partially upon past performance of that bidding party for each key contract parameter.

4. The method of claim 1, wherein the calculation of said rating for each bidding party is based at least partially upon other parameters outside the control of that bidding party for each parameter.

5. The method of claim 4, wherein said other parameters are selected from a group including forecast material demand, commodity price forecasts, exchange rate forecasts, industry trends and historical bidding data.

6. The method of claim 1, the auction event having a prescribed time period for submissions of offers by said bidding parties, wherein this time period is extendable into an extension period to enable submission of an improved bid from at least some of the bidding party computers from which bids have been received within said prescribed time period.

7. The method of claim 6, wherein the bidding parties are able to submit bid during said extension period are selected according to prescribed criteria, the method including providing the bidding party with the best offer at the expiry of the unextended time period an option to submit a very final offer of the event.

8. The method of claim 1, including sending an acceptance message from the administrator computer to the bidding party computer from which a winning bid has been received, and sending a notification message from the administrator computer to the controlling party computer notifying the controlling party of one or more of the bids including the winning bid.

9. The method of claim 1, further comprising the administrator computer comparing a bid, factored by adjustment in accordance with said rating for the bidding party submitting that bid, to prior offers received by the administrator computer and, if that bid does not compete with the best previous bid, sending a message to the bidding party computer of that bidding party that the bid is not acceptable.

10. The method of claim 1, further comprising setting a reserve for award of said contract, such that no acceptance message can be sent for a bid that fails to comply with said reserve.

11. The method of claim 1, further comprising, before commencement of the auction event, receiving opening bids from said bidding party computers and comparing said opening bids to establish a starting bid for the auction event.

12. The method of claim 11, wherein before comparing said opening bids, they are factored by adjustment in accordance with said ratings for the respective bidding parties.

13. The method of claim 1 further comprising, for at least one of said key contract parameters, establishing a range of possible values of said parameter, each of said values being associated with a certain weighting factor, and providing said range of values to each bidding party.

14. The method of claim 1, further comprising providing to a bidding party information specifying said rating for that bidding party.

15. The method of claim 1, wherein said rating for each bidding party is a percentage.

16. The method of claim 1, wherein the rating for each bidding party is a fixed sum discount or surcharge.

17. The method of claim 1, wherein the CBTW for a bidding party is calculated in accordance with the formula:

$$CBTWx_m = FB_{n-1} + (MD/SFx_m)$$

where $x_m$ indicates a particular bidding party (m representing that particular supplier's bid number); n indicates the overall bid number (ie. first bid n=1, second bid n=2, etc); FB indicates a factored bid for said particular bidding party; MD indicates a set minimum bid decrement; and SF is a bidding party factor set in accordance with said bidding party rating.

18. The method of claim 17, wherein FB is calculated in accordance with the formula:

$$FB_n = SBx_n - (MD/SFx_m) + MD$$

where SB is a submitted bid.

19. An administrator computer system for enabling a controlling party to award a contract to a bidding party selected from a panel of predetermined bidding parties, the system operating over a computer network and involving connection between at least one controlling party computer, an administrator computer and at least two bidding party computers, key contract parameters having been established in advance of an auction event and provided to the bidding parties, wherein the key contract parameters include at least one non-price parameter, wherein the system comprises:

means for applying a weighting process by said administrator computer with respect to said parameters for each bidding party of the panel of predetermined bidding parties, to calculate a rating for each said bidding party; and means for, during said auction event, receiving respective bids from the respective bidding party computers, adjusting said bids by said administrator computer by applying said ratings for the respective bidding parties, and using said ratings to provide to each bidder an indication of a current bid to win (CBTW) in respect of said contract, the CBTW calculated by said administrator computer to dynamically indicate to a bidding party the offer that said party must submit to compete with the best previous bid;

wherein the controlling party is a seller and the bidding parties are prospective buyers, each bid received from bidding party computers representing an offer to buy goods or services.

20. The administrator computer system of claim 19, comprising means for:

sending an acceptance message to the bidding party computer from which a winning bid has been received; and sending a notification message to the controlling party computer notifying the controlling party of one or more of the bids including the winning bid.

21. The administrator computer system of claim 19, further comprising means for comparing a bid, factored by adjustment in accordance with said rating for the bidding party submitting that bid, to prior offers received by the administrator computer and, if that bid does not compete with the best previous bid, sending a message to the bidding party computer of that bidding party that the bid is not acceptable.

22. The administrator computer system of claim 19, further comprising means for setting a reserve for award of said contract, such that no acceptance message can be sent for a bid that fails to comply with said reserve.

23. The administrator computer system of claim 19, further comprising, before commencement of the auction event, receiving opening bids from said bidding party computers and comparing said opening bids to establish a starting bid for the auction event.

24. The administrator computer system of claim 23, further comprising means for factoring said opening bids, by adjustment in accordance with said ratings for the respective bidding parties, before comparing said bids.

* * * * *